Dec. 19, 1933.  E. G. GAGE  1,939,686
RADIANT ENERGY DISTANCE DETERMINING SYSTEM
Filed March 14, 1931   3 Sheets-Sheet 1
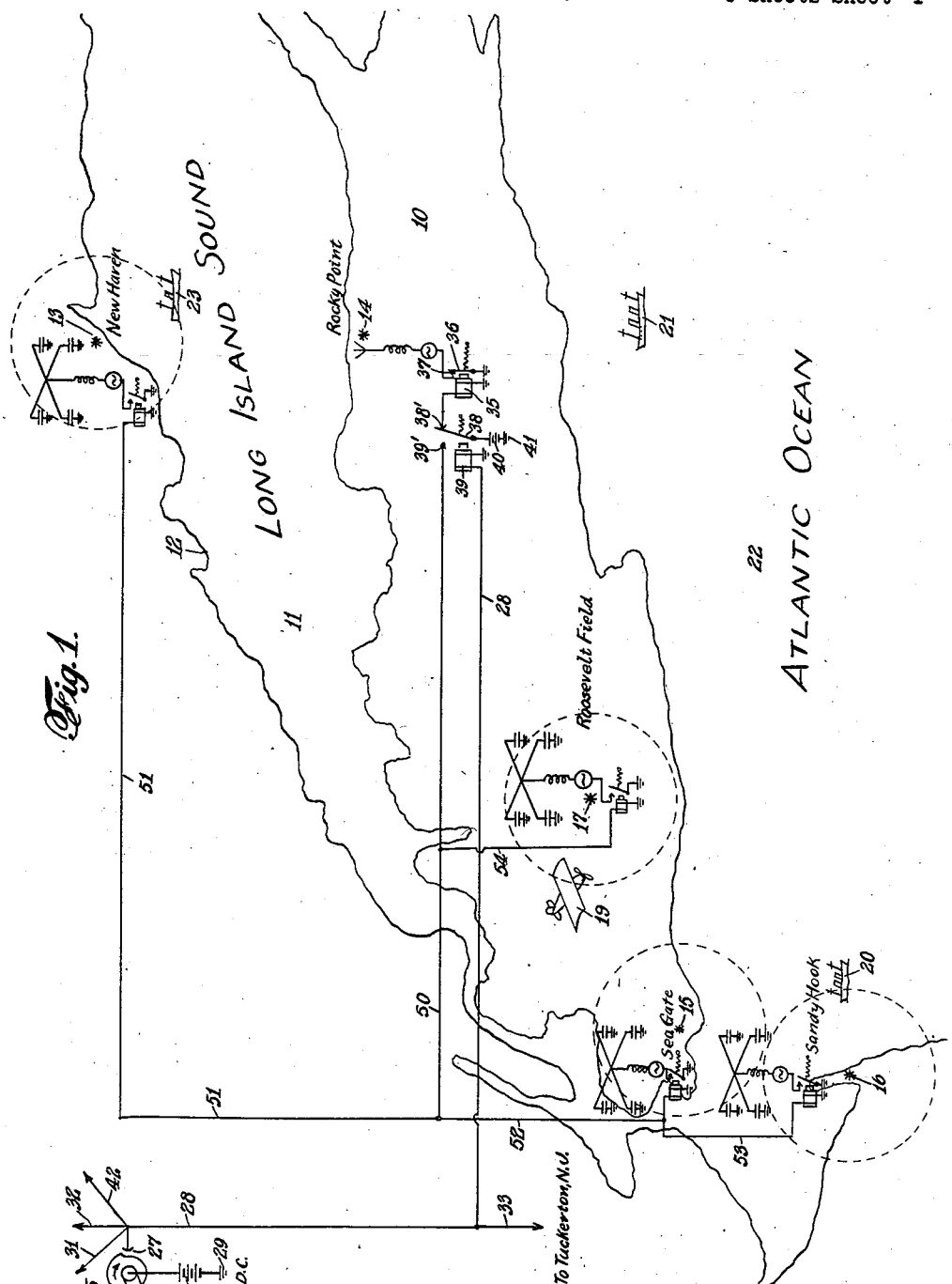
INVENTOR
EDWARD G. GAGE
BY
ATTORNEY Dec. 19, 1933.  E. G. GAGE  1,939,686
RADIANT ENERGY DISTANCE DETERMINING SYSTEM
Filed March 14, 1931   3 Sheets-Sheet 2

INVENTOR
EDWARD G. GAGE
BY
ATTORNEY

Dec. 19, 1933.   E. G. GAGE   1,939,686
RADIANT ENERGY DISTANCE DETERMINING SYSTEM
Filed March 14, 1931   3 Sheets-Sheet 3

INVENTOR
EDWARD G. GAGE
BY
ATTORNEY

Patented Dec. 19, 1933

1,939,686

UNITED STATES PATENT OFFICE 1,939,686

RADIANT ENERGY DISTANCE DETERMINING SYSTEM

Edward G. Gage, Brooklyn, N. Y., assignor of one-half to Leon Ottinger, New York, N. Y., and one-half to Electrical Industries Manufacturing Company, New York, N. Y., a corporation of New York Application March 14, 1931. Serial No. 522,728

12 Claims. (Cl. 250—2)

The invention relates to a radio transmission and reception system and to a novel combination of apparatus utilized therein; and more particularly to the determination of the distance between a radio transmitting station and a radio receiving station, one of which is movable relatively to the other.

In a copending application, Serial No. 504,843, I have disclosed a method and apparatus whereby such determination is effected by the transmission alternately of two signals of like frequency, the one signal being of high attenuation and the other of low attenuation, said signals being received alternately on a single receiver. In a copending application filed by me of even date herewith, a modification in the method is disclosed in that two signals are transmitted at different frequencies and differing attenuation constants. In both cases, however, either the received signal of low attenuation or the received signal of high attenuation is arranged to serve as a standard or marker on a false or inferred zero, the value or effect of the remaining signal serving as an indication of the difference in attenuation, and this difference is utilized as a measure of the distance to be determined.

The former of the aforesaid disclosures embodies also the provision of a local standard of radiated electro-magnetic waves which may be exchanged for the standard of radiated electromagnetic waves sent out by the transmitting station, or utilized in case of failure of the latter.

The present invention contemplates certain improvements, more especially with reference to the standards referred to, and has for an object to improve the accuracy of the distance-finders by improving the standards by which the measurements are made.

A further object of the invention resides in the provision of a chain of sub-master standard stations each of which is arranged to serve as a standard for a plurality of fixed distance-finder stations located within the zone of the sub-master station, the said sub-master stations in turn being controlled by a single centrally located master standard common to all of the sub-master stations.

A still further object of the invention is to provide a local standard with respect to a particular receiving unit which may always be in continuous operation without interfering with the reception of outside signals, serving thus as a permanent marker on a false or inferred zero from which to take readings. By this expedient, switching from standard to incoming signals may be eliminated.

Another object of the invention is to provide means for reception by the heterodyne method; also, in the provision of means for utilizing the value of local heterodyning means associated with the corresponding received signal as a marker for a false or inferred zero on a suitable distance-finding scale, the amount of increase or decrease of the signal energy from this false zero being a measure of the distance.

A still further object of the invention resides in the provision of two indicating instruments for measuring distance—one instrument being used for measuring the effect of the incoming signals, or the effect of a local oscillator, up to a predetermined value and serves also as a marker. The other instrument is adapted for measuring incoming signals beyond the predetermined value. For example, the former will measure units of distance and the latter is adapted for fractional distances. The more sensitive instrument is prevented from injury from currents of a strength sufficient to operate the less sensitive instrument by providing the former with a free-swinging pointer element.

In the accompanying drawings which illustrate the invention, Fig. 1 illustrates diagrammatically the location of a plurality of distance-determining stations operated on the zoning principle, each zone of stations being controlled by a sub-master station which, in turn, is under the control of a central master standard.

Fig. 2 is a detail diagrammatic view illustrating the connections and arrangement of apparatus for a distance-determining station.

Figure 4:
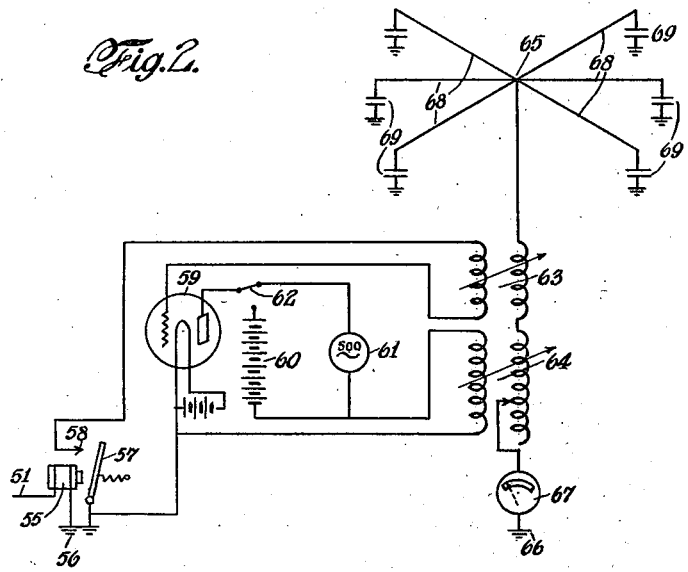
Figs. 4 and 5 are elevations of measuring instruments employed at the receiving station, the former being of a sensitive microammeter type and the latter of a milliammeter type and less sensitive than the former.

Referring to Fig. 1 of the drawings, in which the invention is indicated as applied to a zone comprising the eastern coast line in the vicinity of New York city, the western portion of Long Island is indicated at 10 and the corresponding portion of Long Island Sound at 11, while the Connecticut shore line is indicated at 12. The city of New Haven, Conn., is shown as located at 13, Rocky Point, L. I., at 14, Sea Gate, N. Y., at 15, Sandy Hoook, N. J., at 16, Roosevelt Field Airport at 17, and Washington, D. C., at 18. An airplane 19 is represented in the locality of the Roosevelt Field station 17 and vessels 20 and 21 in the Atlantic Ocean 22, the former vessel in proximity to the Sandy Hook station and the latter in proximity to the Rocky point station. A vessel 23 in Long Island Sound is shown as located in the New Haven zone 13.

At the location 18, Washington, is provided the central master standard of the entire system, and the same comprises a timing cam switch 25 rotated, for example, by motor 26 and is designed to make regular contact with a brush 27 connected to a land line 28, the cam member being grounded at 29 through a source of electrical energy, as the battery 30. The land line 28 extends, in the present instance, to the station 14 at Rocky Point, and further lines 31, 32 and 33 and 42 extend to other zoning districts such, for example, as the Great Lakes, the Gulf States, Tuckerton, N. J., Boston, Mass., etc.

The station 18 through its timing cam switch hereinbefore described is designed to transmit an impulse periodically to the various zones through the different lines 28, 31, 32, 33, 42, etc.; or, in place of these land lines, it may control the sending of electromagnetic energy through separate radio channels, as will be well understood. This electrical energy, communicated either through the land lines or electromagnetically, is transmitted at stated intervals during darkness, storm or fog, as required, to the particular sections of the country, for example, to the station 14 located at Rocky Point. Such sub-master station then is designed to control the operation in a particular zone or zones of apparatus for radiating electromagnetic energy from the different distance-determining transmitting stations therein.

In the arrangement as set forth, station 14 is normally energized through a relay device embodying the electromagnet 35 and a spring-drawn armature 36 attracted thereby to close a circuit at contact 37 when the electromagnet is energized. This energization of the electromagnet 35 is effected through a further spring-drawn armature 38 engaging normally a contact 38' and controlled by an electromagnet 39.

The armature 38 is in circuit with a source of electrical energy, as the battery 40 grounded at 41, and completes the circuit to electromagnet 35 at contact 38' so long as the electromagnet 39 remains de-energized, which will obtain when the brush 27 is not engaged by the timing cam 25. The further land wires 31, 32, 33 and 42 serve to communicate energy to similar relay-controlled distance-determining stations (not shown) and which may, for example, be located in a different zone, such as including the Great Lakes, the Gulf States, Tuckerton, N. J., or Boston, Mass., regions and beyond the influence of the station 14 located at Rocky Point, though operating at the same frequency.

These sub-master stations are designed to be energized by relatively high power and to transmit a signal of low attenuation over a substantial range, say of fifty miles, and their transmitted signals in the embodiment illustrated are capable of being received within the zones covered by the sub-transmitting distance-determining stations 13, 15, 16 and 17. From these latter stations, as will hereinafter be more fully set forth, electromagnetic waves of relatively high attenuation constant are to be radiated. The waves radiated by both types of stations may be of the same frequency, for example 25,000 meters or sufficiently high to clear traffic, or of different frequencies.

The aforesaid sub-transmitting stations are operated and controlled from the station 18, through station 14, by inter-connection with the latter station, as through the land wires 50, 51, 52, 53 and 54, connected in parallel and deenergized when station 14 is energized which occurs when no impulse is being transmitted from station 18.

As soon, however, as the circuit is closed at brush 27, line 28 is energized to operate relay 39 and draw its armature 38 over to the contact 39' to connect the battery 40 with the land line 50 which is connected in turn with the lines 51, 52, 53 and 54.

The transmitting arrangement at the various stations 13, 15, 16 and 17 to which these lines 51, 52, 53 and 54 extend is the same, and each station embodies an electromagnet 55, Fig. 2, grounded at 56 and having a spring-drawn armature 57 adapted to make contact when the electromagnet is energized with a contact point 58 to set in operation a suitable oscillator. The latter includes the thermionic tube 59 and associated circuits and control elements, for example, the oscillator may be energized from a battery 60 or from a modulated source 61 of alternating current, the change from one to the other being effected by a switch 62.

Furthermore, the oscillating circuit is coupled, as through a variable grid coupling 63 and a plate coupling 64, with an antenna 65. The latter is grounded at 66 through a meter 67, and is of the order of a closed loop having the arms or branches 68 extending radially outwardly from its upper end and individually grounded through corresponding series condensers 69. These condensers are located at a distance from the ground comparable to the height of the antenna in order to form a closed type of loop or deformed antenna so as to produce signals of high attenuation, as is more fully set forth in my copending application, Serial No. 504,843. The attenuation constant of the radiated energy from an antenna 65 is such that the signals will have only a limited range, for example, five miles. Thus, while the signals transmitted from the station 14 may be at the same frequency as those transmitted from the various stations 13, 15, 16 and 17, the latter are transmitted at a different time interval and different attenuation constant.

The locations of these stations 15, 16 and 17 are approximately at the same distance from the station 14 controlling the said stations; and vessels or airplanes, etc., in the locality of one or the other of said stations 13, 15, 16 and 17 provided with receiving stations as hereinafter more fully set forth, will receive the signals from the station 14 with substantially the same intensity, while signals received from any of the stations 15, 16 and 17 will vary in intensity rapidly with the distance from said station and in an inverse ratio.

To illustrate further, the greatest distance a receiver could be from the station 14, or the sub-master station for receiving in the New York district and also receive within a five-mile radius from station 16 at Sandy Hook, would be approximately 55 miles. The shortest distance it could be would be 45 miles. This shows a possible difference of 10 miles in fifty, which is insufficient to cause a serious error in reading the standard signal.

If it is desired to reduce this error, a receiving station can, by determining its geographical position, reduce or increase its readings in accordance with the predetermined correction factor for the exact distance.

The design of the antenna associated with the sub-transmitting stations is such as to be best suited for the attenuation which it is desired to maintain at a particular station, and the power supplied to such station may, for example, be 5 kw. at a frequency of, for example, 10,000 cycles or 30,000 meters wave length. Shorter wave lengths may be utilized if traffic conditions permit.

Figure 3:
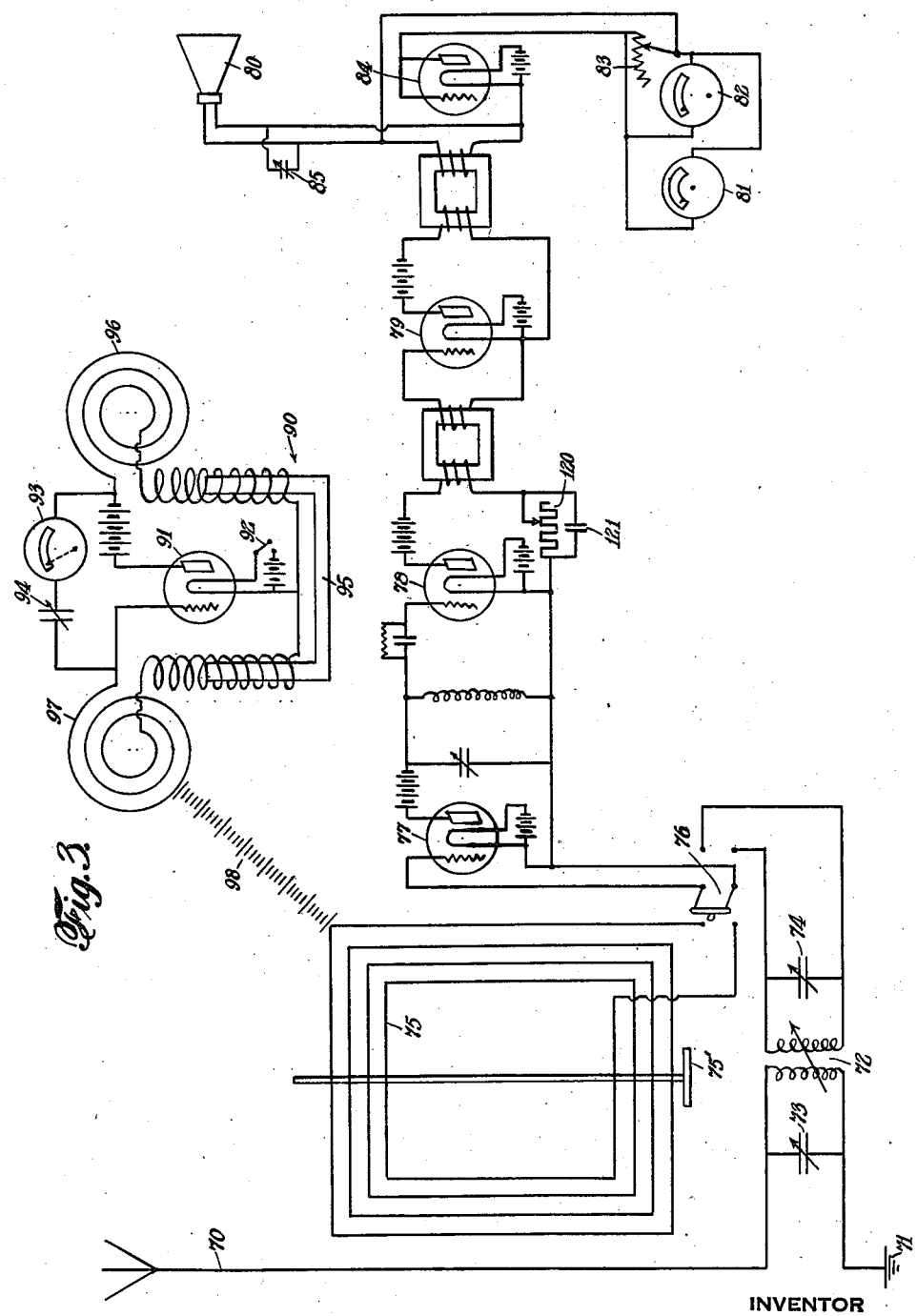
Fig. 3 illustrates diagrammatically the electrical connections and apparatus of a distance-determining receiving station.

A suitable receiving station for use on the airplane 19, vessels 20, 21, 23 or the like, is indicated in Fig. 3 of the drawings, and embodies a suitable receiving antenna 70 for picking up signals, the same being grounded at 71 and provided with a variable coupling coil 72 and tuning condensers 73 and 74. A further and loop type antenna 75 may be associated with the receiving circuit for determining the direction of the transmitting station, and a double-throw double-pole switch 76 is provided to cut in either of the antennæ 70 or 75.

A receiving circuit embodying the radio frequency amplifying tube 77, detector tube 78 and audio frequency amplifying tube 79 may thus be connected either to the antennæ 70 or the loop 75 for reproduction of the signals by a loudspeaker member 80 and for indication on suitable instruments 81 and 82 connected in parallel and having shunted across the same a regulating variable resistance 83. The output from the receiving circuit hereinbefore described has associated therewith a rectifying tube 84 with strapped grid-plate, and a variable condenser 85 is bridged across said output circuit for limiting the amount of radio frequency energy picked up from a local oscillator 90 which may be associated with the said receiving circuit.

The said oscillator 90 embodies the oscillator tube 91 with control switch 92 for its filament, and a hot wire or thermo-ammeter 93, and variable condenser 94 for tuning the oscillator, said oscillator being arranged for heterodyning the incoming received signal as well as for providing a local standard, as will hereinafter be more fully set forth.

There is further associated with the oscillator 90 a laminated iron core 95 whose two arms are inserted in the respective coils 96 and 97 of the oscillator radiating circuit for the purpose of varying the coupling between the two coils and consequently varying the output of the oscillator to change the wave shape to such an extent that the energy radiated by the oscillator will be broadly tuned by the receiver. A scale 98 serves to locate the correct position of the oscillator 90 with respect to the loop 75, or antenna 70, for optimum heterodyning.

Figure 5:
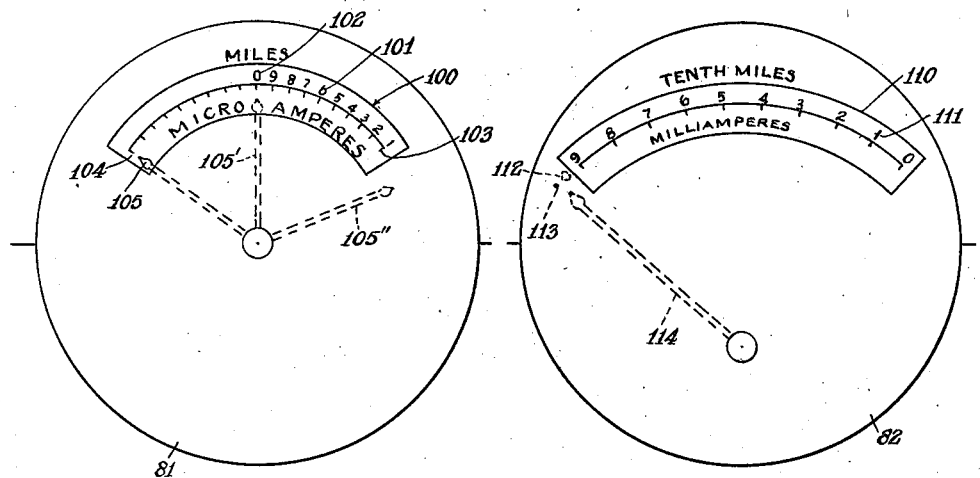

The instruments 81 and 82 are more particularly shown in Figs. 4 and 5 respectively and embody an arcuate scale opening 100 through the instrument casing and through which are visible in the case of the former instrument graduations 101, provided with a false or inferred zero 102, for measuring units of distance. A further scale 103 is visible through the scale opening 100 and is located immediately below scale 101, being graduated for measuring received current and provided with a true zero 104. A needle 105 which may be actuated by a moving coil type of galvanometer is normally located when at rest at the true zero position 104, and its position when at the false or inferred zero 102 is indicated at 105′, being brought thereto by the received energy of incoming signals from a distant sub-transmitting station or from the local heterodyne or oscillator 90. The position 105″ indicates the needle 105 off-scale and under the influence of a strong received signal, and the needle is no longer visible through the opening 100, being free to swing in a circle about its pivot point and to remain out of sight for the duration of such strong signal.

The instrument 81 to this end is constructed without any stop for the needle so that it will not be injured by a strong deflection which merely causes the attached moving coil to take up a neutral position between the magnets of the instrument. It is, furthermore, of a more sensitive type than instrument 82, for example, it may be a microammeter.

The other instrument 82 is of the milliammeter type and less sensitive, and is likewise equipped with a scale opening 110, and graduations 111 visible therethrough are adapted for the measurement of distances in fractions of a mile. It also has a false or inferred zero 112 just out of sight behind the one side edge of the opening 110 or just in line with said edge. The "dot" position 113 beyond the false zero position 112 indicates the true zero for the instrument.

This latter instrument may be of the moving coil type and its needle 114 is actuated by the same current that moves needle 105 of the instrument 81. The position of the needle indicated in Fig. 5 is that in which the same is at rest and corresponds to the position 104 of needle 105.

Signals transmitted from a sub-transmitting station, such as station 14, and from a distance-determining station, such as the stations 13, 15, 16 and 17, are received alternately by the receiving apparatus hereinbefore described. Such receiving apparatus is to be adjusted as follows:

In the case of the incoming signal of low attenuation, the needle 105 of the instrument 81 is adjusted to assume the false or inferred zero position 105′, regardless of the distance of the receiving instrument from the station 14. This is effected by adjusting shunt 83, after tuning to maximum reception by means of the pick-up antenna 70 and the associated coupling and tuning apparatus 72, 73 and 74, said antenna 70 having been cut into circuit through switch 76.

After an interval of, for example, about one second and depending upon the timing of the cam switch 25, the signal from the sub-transmitting station will cease. Instantly thereafter another reading of the needle will appear, as the sub-transmitting station is switched off by the switch 25 at station 18, and will result from the reception of the signal from a distance-determining transmitting station 13, 15, 16 or 17 of high attenuation. This latter position of the needle will be either greater or less than that corresponding to the previously received signal from the sub-transmitting station 14. If less, then the receiving station is beyond the prescribed range (indicated by the circle shown in dash lines) of a distance-finding transmitting station. By watching the needle, an operator can tell whether he is approaching or receding from such station, accordingly as the instrument reading increases or decreases.

All of the sub-transmitting stations and all of the local distance-determining transmitting stations within its zone are characterized by a call letter which is sent out automatically or manually from time to time or immediately following each signal, in a manner well understood, for example, as described in my copending application Serial No. 504,843. The operator therefore is always cognizant of his approximate location.

In instances where an important distance-determining transmitting station is located much nearer to a sub-transmitting station than the remaining distance-determining transmitting station of a particular zone, it will be necessary to provide a special false zero value on the scale 101 when operating within the prescribed radius of this important station, and the signal received from this particular sub-transmitting station should be read from the aforesaid false zero when operating in the zone of the said important distance-determining transmitting station.

An example of such a condition would be the distance-determining transmitting station 13, located at New Haven, Conn., when working with Sound steamers or airplanes. This results from the fact that the particular station 13 is much nearer the sub-transmitting station 14, at Rocky Point, for this zone, and signals from the station 14 would therefore be much stronger than those received in the vicinity of Sea Gate and Sandy Hook.

Therefore, the false zero for all receivers when taking readings from the station 13 located at New Haven is placed much nearer the maximum reading of the meter scale 101 than the false zero for readings when working in the vicinity of Sandy Hook, for example. These false zero positions are, of course, previously determined, by trial and calibration; and, as hereinbefore noted, in such instances the signals from station 13 would be characterized by a particular call letter in order that an operator would know when to change to the proper false zero.

After having determined the proper false zero position and set the instrument needle accordingly, an operator at any time when he is within the prescribed radius of a distance-determining transmitting station can take the readings directly from either meter 81 or meter 82. It is necessary to make certain that the needle under the influence of signals from the sub-transmitting station always returns to the position of the false zero 102 immediately before a reading is taken for the signals from the distance-determining tansmitting station and which are read on the right hand half of scale 101.

If the distance between the receiving station and the distance-determining transmitting station be greater than a mile or other unit of distance, the instrument 81 operates in the following manner:

As soon as the receiving station approaches to within one mile or one unit of distance, the needle 105 is thrown more or less violently off scale and disappears from view behind the instrument casing. The last reading on scale 101 is for one mile or one unit and terminates substantially at the corresponding edge of dial opening 100. As hereinbefore noted, the instrument is constructed without any stop for the needle, which needle will therefore not be injured by a strong deflection and swings in a circle to a neutral position. In the meantime, the more or less rugged and less sensitive instrument 82 has begun to show a slight movement of its needle 114 which normally rests on the true zero 113 and out of sight behind the instrument casing.

As the receiver station approaches to within say, three-fourths of a mile, as might be the case of an airplane passing over a station or a ship passing close to a lighthouse, needle 114 will show a deflection on the scale 111 and upon which the distance may be read directly, the scale being graduated in fractions of a mile.

At the termination of reception of the signals from the distance-determining transmitting station, both needles 105 and 114 return to their positions as determined by the standard signal needle 114 returning to the zero 113 out of sight of the operator and the needle 105 to the position of the false zero 102 and visible to the operator. Each of the two instruments thus serves to register automatically signals within its range only, and indicates at a glance the approximate distance between the vessel upon which the receiving station is located and the distance-determining transmitting station from which it is receiving a signal.

Any increase or decrease of the value of the adjustable shunt 83 correspondingly affects both the effect of the signal from the sub-transmitting station and the effect of the signal from the distance-determining transmitting station alike, as does any variation of the amplifier of the receiving circuit, for example, in the adjustment of a variable resistance 120 of the output circuit of detector 78 and which may be of the order of magnitude of 500,000 ohms shunted by a condenser 121. This resistance operates to control the gain of the amplifier 79 by limiting the current in the detector plate circuit in well known manner, and may thus be caused to position needle 105 to the false zero 102 when signals are too weak to allow of the use of shunt 83, which, in this instance, is then open-circuited.

During the taking of the distance readings, the loudspeaker 80 (or head phones) may be kept in operation as an aural guide to tuning in the sub-transmitting station signals and the signals from the distance-determining transmitting stations.

If the signals transmitted from the former station are modulated continuous waves, then the signals from the latter station should also be modulated continuous waves of the same degree of modulation.

Where the transmitted signals are of the modulated type, the local heterodyne oscillator 90, of course, is not utilized, but is intended only for use with signals of the unmodulated type.

The reception involving the use of oscillator 90 is as follows:

The coil 97 is originally set to the correct distance from antenna 70 for optimum heterodyning, and condenser 94 is adjusted until the required difference between the incoming signal and the local oscillator is obtained, which is accomplished by listening to the response of the loudspeaker 80. As an example, where the incoming signals from the transmitting stations are on waves of 30,000 meters or a frequency of 10,000 cycles, the local heterodyne apparatus should be tuned to a frequency of either 10,700 cycles or 9,300 cycles which results in a beat note of 700 cycles in the receiving circuit.

The readings are then taken as hereinbefore described, all readings being taken on scales previously calibrated by going through the same procedure and marking results on a scale over a measured distance.

To use the receiving apparatus as a direction finder, it is necessary merely to throw over switch 76 to connect in the loop 75, and to rotate the latter by means of the handle 75' until sound in the loudspeaker is a maximum, or the needle deflections of instruments 81 and 82 are a maximum. The transmitting station will then be in line with the plane of the loop.

If the local heterodyne apparatus 90 is utilized for direction-finding signals, coil 97 should be permanently fixed to the loop to avoid variation in local heterodyne intensity.

In case of failure at any time of the sub-transmitting station, the following procedure may be carried out:

The local heterodyne oscillator 90 as hereinbefore described has been adjusted to a local standard value and should never be altered, neither with reference to the distance of coil 97 from the loop 75 nor its distance from the antenna 70, nor with reference to the electrical constants or energizing source. It should also show the same value of radio frequency current in its standardizing meter 93 at a given frequency, which frequency should vary but slightly with change of frequency caused by varying the condenser 94. Therefore, with a given audiofrequency note of the resultant signal, for example 700 vibrations per second, the output of the oscillator 90 will always be the same.

Taking advantage of this fact, the oscillator can be used to transmit a definite amount of radio frequency energy to the loop 75 or to the antenna 70 as the case may be, the effect of which will always be registered on the receiving instruments 81 and 82 at exactly the same value. This should be marked by the false or inferred zero position as hereinbefore set forth. This value is determined, apart from the energy and the distance away of the oscillator itself, by the condenser 85 which is placed across the output circuit of the final amplifier, which circuit feeds the received energy to the instruments 81 and 82 through rectifier 84. When this condenser 85 is of optimum value, due to the characteristics of ultra-long waves, such as those of the order of 30,000 meters, iron may be successfully utilized in the radio frequency circuits. Because of the fact that the iron is also used in the audiofrequency transformer circuits of the amplifier 79, the said circuits (transformer) serve to supply a large amount of radio frequency current as well as audiofrequency current to the rectifier 84 and hence to instruments 81 and 82.

The percentage of radio to audiofrequency energy which is thus transferred through the rectifier and registered on the instruments 81 and 82 is regulated by the capacitance of condenser 85. When of optimum value, it forms a resonant circuit with the output (transformer) circuit and a very large amount, usually too large, is transferred. The capacity of condenser 85 should be so adjusted, by increasing it, that at a predetermined distance from the transmitter, the needle 105 of instrument 81 should read on the false or inferred zero 102. This adjustment should never be changed when once finally made, and any change in the amplifier will affect the instrument needle reading for energy received from a local heterodyned sub-transmitting station signal to a like degree with the exception of an ambiguity resulting from a difference in their frequencies.

To avoid this ambiguity the iron yoke 95 is previously inserted in the coils 96 and 97, which has the effect externally of increasing the coupling between the two coils and increasing their inductance. It also changes the wave shape of the oscillator to such an extent that its resonance curve is broader than that of the received signal.

Therefore, when it is detuned from the incoming signal to obtain an audible note or audiofrequency reading on the instrument, the energy received from it is changed but very little, if at all, and consequently any change in tuning of the receiver does not affect the reception of the local heterodyne to a degree which would be disastrous to the accuracy of the resultant signal, if the value should fall below the optimum heterodyne value.

The incoming unmodulated radio frequency signals will always combine with the measured local heterodyne energy to produce an audiofrequency value on the instruments proportional to the intensity of the received signal. When once this intensity has been calibrated in terms of distance, the same intensity of signal will always indicate the same value in terms of distance.

With the local standard heterodyne in operation as described, all that is necessary to take a distance reading is to receive a signal from a distance-determining transmitting station and note its value on the instruments 81 or 82 which have previously been calibrated over a like course and will register directly the distance in the absence of the reception of signals from a sub-transmitting station.

It is obvious that the local heterodyne standard may at any time be used in systems not having a sub-transmitting station, or that it may be used as a check on such transmitting station by causing the latter to skip a signal at intervals.

It is possible, also, to have but a single sub-transmitting station centrally located and of super-power, and to calibrate all receivers from it, making use of a special false or inferred zero for each geographical location, from which readings may be taken from the sub-transmitting station and distance-determining transmitting station signals.

Many other variations in my system may be made without departing from the scope of the appended claims.

I claim:

1. In the reception of unmodulated electromagnetic waves, the method of measuring the intensity thereof which comprises heterodyning said incoming waves with locally developed waves, comparing the effect of the heterodyned waves with a standard determined by the locally developed waves, and controlling the effect of said last-named waves.

2. In the reception of unmodulated electromagnetic waves, the method of measuring the intensity thereof which comprises heterodyning said incoming waves with locally developed waves, broadening the resonance curve of the locally-developed energy, comparing the effect of the heterodyned waves with a standard determined by the locally-developed waves, and controlling the effect of said last-named waves.

3. In a system of the character set forth: a sub-master transmitting station for electromagnetic waves of low attenuation, a plurality of distance-determining transmitting stations located within the transmitting radius of the sub-master station and adapted for the transmission of electromagnetic waves of relatively high attenuation, means for controlling the transmission of electromagnetic waves from said sub-master station and operative to cause transmission from the distance-determining transmitting stations alternately with the sub-master station, a receiving circuit including a pair of receiving antennæ adapted to be connected thereto and with characteristics corresponding to the respective transmitted waves from the distance determining transmitting station and the sub-master transmitting station, and instrumentalities in the receiving circuit subject to the effect of the said received waves.

4. In a system of the character set forth: a sub-master transmitting station for electromagnetic waves of low attenuation, a plurality of distance-determining transmitting stations located within the transmitting radius of the sub-master station and adapted for the transmission of electromagnetic waves of relatively high attenuation, a master station including means to periodically transmit energy to the sub-master station for controlling the transmission of electromagnetic waves from said sub-master station and operative to cause transmission from the distance-determining transmitting stations alternately with the sub-master station, a receiving circuit including a pair of receiving antennæ adapted to be connected thereto and with characteristics corresponding to the respective transmitted waves from the distance determining transmitting station and the sub-master transmitting station, and instrumentalities in the receiving circuit subject to the effect of the said received waves.

5. In a system of the character set forth: a sub-master transmitting station for electromagnetic waves of low attenuation, a plurality of distance-determining transmitting stations located within the transmitting radius of the sub-master station and adapted for the transmission of electromagnetic waves of relatively high attenuation, a master station, circuit-closing means at the master station, relay mechanism at the sub-master station to control the transmission of electromagnetic waves therefrom under the action of the master station circuit-closing means, relay means to control the operation of the distance-determining transmitting stations under the operation of the sub-master transmitting station relay means, a receiving circuit including a pair of receiving antennæ adapted to be connected thereto and with characteristics corresponding to the respective transmitted waves from the distance determining transmitting station and the sub-master transmitting station, and instrumentalities in the receiving circuit subject to the effect of the said received waves.

6. In a system of the character set forth: a sub-master transmitting station for electromagnetic waves of low attenuation, a plurality of distance-determining transmitting stations located within the transmitting radius of the sub-master station and adapted for the transmission of electromagnetic waves of relatively high attenuation, means for controlling the transmission of electromagnetic waves from said sub-master station and operative to cause transmission from the distance-determining transmitting stations alternately with the sub-master station, a receiving circuit including a pair of receiving antennæ adapted to be connected thereto and with characteristics corresponding to the respective transmitted waves from the distance determining transmitting station and the sub-master transmitting station, instrumentalities in the receiving circuit subject to the effect of the said received waves, a local standard exchangeable for the sub-master station signal and comprising a local oscillator for heterodyning the incoming signals from a distance-determining transmitting station, and a variable capacitance in the output of the receiving circuit for controlling the ratio between radio frequency and audiofrequency energies.

7. In a system of the character set forth: a sub-master transmitting station for electromagnetic waves of low attenuation, a plurality of distance-determining transmitting stations located within the transmitting radius of the sub-master station and adapted for the transmission of electromagnetic waves of relatively high attenuation, means for controlling the transmission of electromagnetic waves from said sub-master station and operative to cause transmission from the distance-determining transmitting stations alternately with the sub-master station, a receiving circuit including a pair of receiving antennæ adapted to be connected thereto and with characteristics corresponding to the respective transmitted waves from the distance determining transmitting station and the sub-master transmitting station, instrumentalities subject to the effect of the said received waves, said instrumentalities including measuring means embodying two electrical measuring instruments, the one being more sensitive than the other and provided with a scale having an inferred zero, and means to adjust the incoming signal from the sub-master transmitting station to said inferred zero position and both of said instruments being subjected to the same incoming signal current.

8. In a system of the character set forth: a sub-master transmitting station for electromagnetic waves of low attenuation, a plurality of distance-determining transmitting stations located within the transmitting radius of the sub-master station and adapted for the transmission of electromagnetic waves of relatively high attenuation, means for controlling the transmission of electromagnetic waves from said sub-master station and operative to cause transmission from the distance-determining transmitting stations alternately with the sub-master station, a receiving circuit including a pair of receiving antennæ adapted to be connected thereto and with characteristics corresponding to the respective transmitted waves from the distance determining transmitting station and the sub-master transmitting station, instrumentalities subject to the effect of the said received waves, said instrumentalities including measuring means embodying two electrical measuring instruments, the one being more sensitive than the other and provided with a scale having an inferred zero, and means to adjust the incoming signal from the sub-master transmitting station to said inferred zero position and both of said instruments being subjected to the same incoming signal current, and the measuring pointer of the first-named instrument being free to swing off the scale and the pointer of the other instrument normally being invisible until the former pointer has disappeared.

9. The method of determining by radiant energy, the distance between transmitting and receiving units thereof, which comprises radiating alternately from different localities two electromagnetic waves of different attenuation constants, receiving the respective waves, and ascertaining visually the difference between their effects as a measure of the distance sought by first bringing the one received wave to a predetermined visual value and then comparing the visual value of the other received wave therewith.

10. The method of determining by radiant energy, the distance between transmitting and receiving units thereof, which comprises radiating alternately from different localities two electromagnetic waves of different attenuation constants, receiving the respective waves, ascertaining visually the difference between their effects as a measure of the distance sought by first bringing the one received wave to a predetermined visual value and then comparing the visual value of the other received wave therewith, and simultaneously therewith effecting an aural indication of the received energy.

11. The method of determining by radiant energy, the distance and direction between transmitting and receiving units thereof, which comprises radiating alternately from different localities two electromagnetic waves of different attenuation constants, receiving the respective waves and simultaneously indicating their direction, and ascertaining visually the difference between their effects as a measure of the distance sought by first bringing the one received wave to a predetermined visual value and then comparing the visual value of the other received wave therewith.

12. The method of determining by radiant energy, the distance between a transmitting and a receiving unit thereof, which comprises radiating alternately from the transmitting unit and a second and remotely located transmitting unit two electromagnetic waves of different attenuation constants, receiving the respective transmitting waves at a common locality, and visually ascertaining thereat the difference between their effects as a measure of the distance between the receiving unit and the nearer transmitting unit.

EDWARD G. GAGE.